INVENTOR.
Thomas W. Bermel
BY William J. Simmons Jr.

ATTORNEY

United States Patent Office 3,515,159
Patented June 2, 1970

3,515,159
FLUID MAJORITY GATE
Thomas W. Bermel, Corning, N.Y., assignor to Corning Glass Works, Corning, N.Y., a corporation of New York
Filed Apr. 23, 1968, Ser. No. 723,475
Int. Cl. F15c 1/12
U.S. Cl. 137—81.5                                    11 Claims

ABSTRACT OF THE DISCLOSURE

A fluid majority gate including a fluid amplifier having first and second opposed control nozzles and a plurality of fluid amplifier-inverters, each having a stable outlet passage connected to the first fluid amplifier control nozzle and each having a unstable outlet passage connected to the second fluid amplifier control nozzle. The fluid flowing in the fluid amplifier outlet passages is indicative of the number of fluid signals present at the inputs of the fluid amplifier-inverters.

BACKGROUND OF THE INVENTION

The present invention relates to a fluid amplifier circuit for performing logical functions, and more particularly to a majority gate consisting entirely of fluidic components.

Since the invention of the fluid amplifier, fluid devices and systems have found acceptance in an increasing number of applications including data processing, missile attitude control, automatic pilots, industrial equipment control, and the like.

These systems utilize fluid operated logic circuits and therefore have many advantages over electronic circuitry. Some of the numerous well-known advantages of fluid amplifiers are inexpensive fabrication, ability to withstand extreme environmental conditions such as shock, vibration, high temperature and nuclear radiation. They are virtually trouble free in operation since they utilize no moving parts other than the fluid itself. The above enumerated features permit substantially unlimited lifetimes of uninterrupted operation.

SUMMARY OF THE INVENTION

It is accordingly an object of the present invention to provide a fluid amplifier circuit for performing the logical majority gate function.

A further object of this invention is to provide a fluidic circuit, the output of which is proportional to the number of inputs applied thereto.

Briefly, the fluidic circuit of this invention includes a plurality of fluid logic means, each producing a fluid output signal from a first outlet passage prior to the application of a fluid control signal to the input thereof and each producing a fluid output signal from a second outlet passage in the presence of a fluid control signal at the input thereof, and an output fluid amplifier having first and second opposed control nozzles and at least one outlet passage. First coupling means connects the first outlet passages of the plurality of fluid logic means to the first control nozzle of the output fluid amplifier. Second coupling means connects the second outlet passages of the plurality of fluid logic means to the second control nozzle of the output fluid amplifier. The fluid flowing in the fluid amplifier outlet passage is indicative of the number of fluid logic means to which control signals have been applied.

Additional objects, features and advantages of the present invention will become apparent to those skilled in the art from the following detailed description and the attached drawing on which, by way of example, only the preferred embodiment of this invention is illustrated.

DETAILED DESCRIPTION

Figure 1:
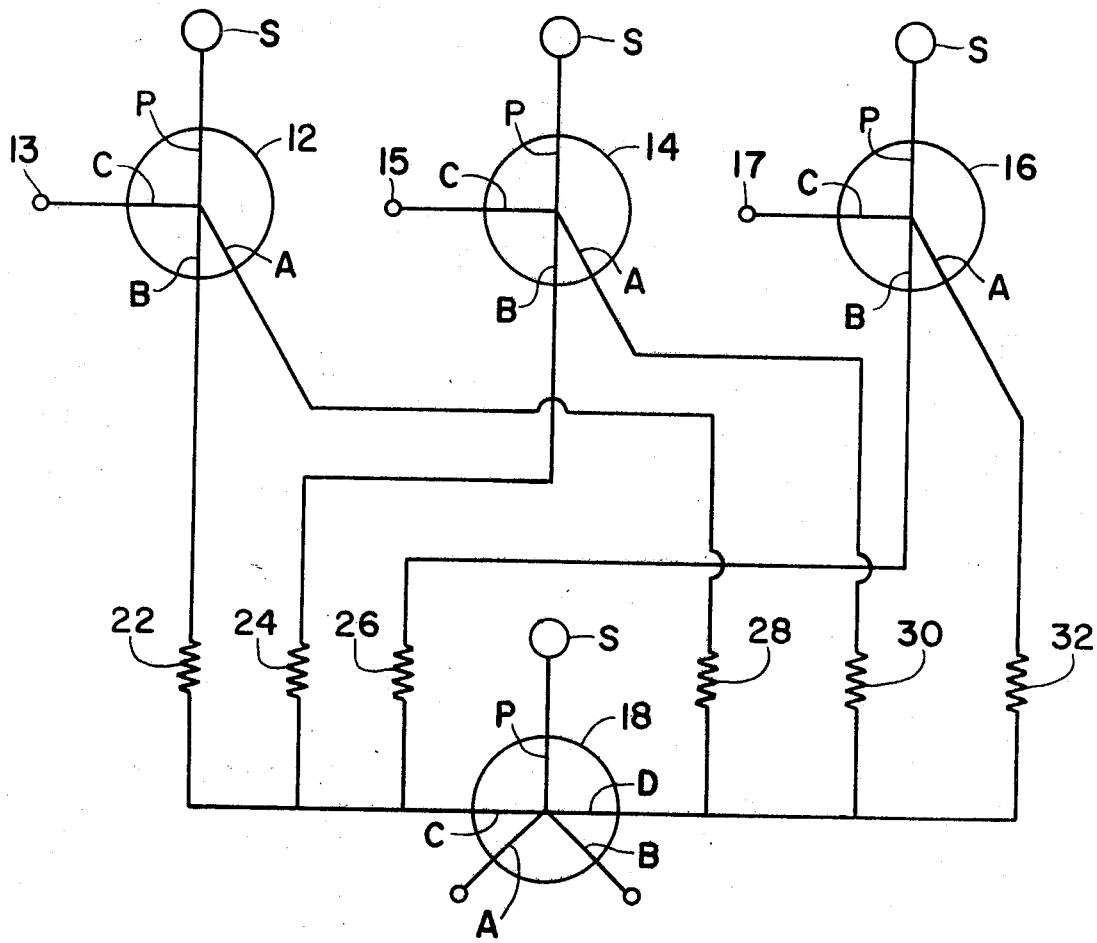
FIG. 1 is a schematic diagram of a majority gate which utilizes only fluidic components.

Referring to FIG. 1 there is shown a schematic diagram of a fluid majority gate which consists of a plurality of fluid amplifier-inverters 12, 14 and 16 and a fluid amplifier 18. Each of the fluid amplifier devices 12, 14, 16 and 18 includes a power stream nozzle P which is connected to a suitable source of fluid S. The fluid amplifier-inverters have first and second outlet passages A and B, and a single control signal input nozzle C. The fluid amplifier 18 has first and second outlet passages A and B and first and second opposed control nozzles C and D.

A plurality of fluid signal inlet passage 13, 15 and 17 are connected to the control nozzles 12C, 14C and 16C, respectively. The inverters 12, 14 and 16 are fluidic devices in which the power stream issuing from the nozzle P is directed substantially entirely to the outlet passage B. The passage B is therefore referred to as the stable outlet passage. The control nozzle C is disposed such that a fluid signal applied thereto will cause the power stream to be deflected to the unstable outlet passage A.

The fluid amplifier 18 may be a conventional bistable amplifier or it may be a conventional proportional amplifier. As is well known, the geometry of the interaction region into which the power stream and the control streams issue determines whether the power stream will lock onto one of the sidewalls of the interaction chamber and issue from only one of the outlet passages or whether the power stream will issue from either or both of the output channels depending upon the control signals present at the control nozzles C and D. Reference may be made to chapters 12 and 13 of Kirshner's Fluid Amplifiers, 1966, McGraw-Hill, Inc. for further details on bistable and proportional amplifiers.

The stable outlet passages B of the inverters 12, 14 and 16 are connected to the control nozzle C of the fluid amplifier 18 by a plurality of fluid resistors 22, 24 and 26, respectively, and the unstable outlet passages A of the inverters are connected to the control nozzle D of the amplifier 18 by the fluid resistors 28, 30 and 32, respectively.

If the circuit shown in the figure is to function as a majority gate, a fluid amplifier 18 must be bistable. Switching from one stable state to the other occurs when a pressure difference exists between the control signal input nozzles C and D. When no fluid signal exists at the inlet passages 13, 15 and 17, a fluid output will flow from the output channels B of the inverters 12, 14 and 16, causing a high pressure to exist at the control nozzle C of the bistable amplifier 18. Therefore, a fluid output signal will appear at the outlet passage 18B. When a fluid signal exists at only one of the inlet passages 13, 15 or 17, fluid will flow from one of the respective outlet passages A and cause a corresponding pressure increase at the control nozzle 18D. However, this pressure will be les than that at the control nozzle 18C since fluid flowing from two of the inverter outlet channels B is coupled to the nozzle 18C. A fluid output signal therefore continues to exist at the outlet passage 18B.

When a fluid signal is applied to any two of the inlet passages 13, 15 and 17, no fluid signal existing at the remaining passage, fluid will flow from two of the inverter outlet passages A and only one of the inverter outlet passages B, and the pressure at the control nozzle 18D is therefore greater than that at nozzle 18C. The bistable amplifier 18 will therefore be switched so that a fluid output signal will exist at output channel 18A. The same output conditions will exist if fluid input signals are applied to all of the inlet passages 13, 15 and 17.

An odd number of fluid amplifier-inverters is required to perform a majority gate function. However, any number of fluid amplifier-inverters could be employed if the disclosed circuit is to be utilized to provide a differential fluid output signal which is proportional to the number of inverters to which an input signal is being applied. For this latter function, the fluid amplifier 18 must be a proportional amplifier. The pressure differential existing at the output channels 18A and 18B will be related to the number of fluid input signals being applied to the inlet passages 13, 15 and 17. For example, if input signals are applied to only the passages 13 and 15, fluid will flow from the outlet passages 12A and 14A and through the fluid resistors 28 and 30 to the proportional amplifier control nozzle 18D. Since no signal is applied to the passage 17, fluid will flow from the stable outlet passage 16B and thereafter through the fluid resistor 26 to the control nozzle 18C. A pressure differential will exist between the outlet passages 18A and 18B, the pressure at passage 18A being greater than that at 18B.

Figure 2:
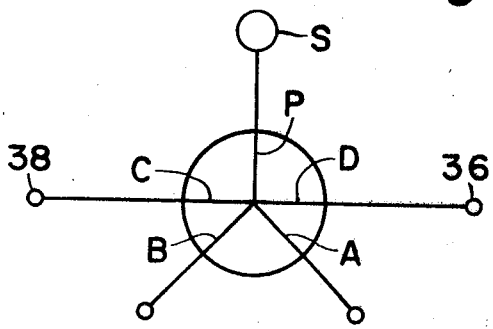
FIG. 2 is a schematic diagram of a bistable fluid amplifier which may be used to modify the circuit of FIG. 1.

A minor modification to the illustrated circuit will permit yet another mode of operation. Each of the fluid amplifier-inverters 12, 14 and 16 could be replaced by a bistable amplifier which is schematically illustrated in FIG. 2. A reset signal is initially applied to the reset inlet passage 36 so that a fluid output will flow from the output channel B. A fluid pulse applied to the fluid signal inlet passage 38 will cause the fluid output to switch to the output channel A and remain in this condition until another reset signal is applied to the reset inlet passage 36. Whereas the inverter-amplifiers 12, 14 and 16 of FIG. 1 are monostable and require the simultaneous application of fluid signals to a majority of the inlet passages to cause a change in the fluid output from the bistable amplifier 18, the bistable device of FIG. 2 will remain in the switched condition after the cessation of the fluid input signal at its inlet passage 38. Therefore, when a majority of the inlet passages have had signals applied thereto, even though the signals do not exist concurrently, the bistable amplifier 18 will switch to its condition wherein a fluid output flows from the output channel A. This output condition will exist until the next reset pulse is applied to each of the reset inlet passages 36.

I claim:

1. A pure fluid logical circuit comprising
a plurality of fluid logic means, each producing a fluid output signal from a first outlet passage prior to the application of a fluid control signal to the input thereof and each producing a fluid output signal from a second outlet passage in the presence of a fluid control signal at the input thereof,
an output fluid amplifier having first and second opposed control nozzles and at least one outlet passage.
first means for connecting the first outlet passages of said plurality of fluid logic means to the first control nozzle of said output fluid amplifier, and
second means for connecting the second outlet passages of said plurality of fluid logic means to the second control nozzle of said output fluid amplifier,
the fluid flowing in said output fluid amplifier outlet passage being indicative of the number of said fluid logic means to which fluid signals have been applied.

2. A pure fluid logical circuit in accordance with claim 1 wherein said plurality of fluid logic means each comprises a monostable fluid amplifier-inverter.

3. A pure fluid lgoical circuit in accordance with claim 1 wherein said plurailty of fluid logic means each comprises a bistable fluid amplifier, and means to reset said bistable amplifiers to a predetermined state.

4. A pure fluid logical circuit in accordance with claim 1 wherein said output fluid amplifier is bistable.

5. A pure fluid logical circuit in accordance with claim 1 wherein said output fluid amplifier is a proportional amplifier.

6. A pure fluid logical circuit in accordanue with claim 1 wherein said first connecting means comprises a plurality of fluid resistors respectively connecting each of the first outlet passages of said fluid logic means to the first control nozzle of said output fluid amplifier and said second connecting means comprises a plurality of fluid resistors respectively connecting each of the second outlet passages of said plurality of fluid logic means to the second control nozzle of said output fluid amplifier.

7. A pure fluid logical circuit in accordance with claim 1 wherein said plurality of fluid logic means comprises an odd number of fluid amplifiers and said output fluid amplifier is bistable, whereby said circuit performs a majority gate function.

8. A pure fluid logical circuit in accordance with claim 1 which further comprises means for applying discrete digital fluid signals to each of said plurality of fluid logic means.

9. A pure fluid logical circuit in accordance with claim 1 wherein
each of said plurality of fluid logic means comprises a monostable fluid amplifier-inverter,
said first connecting means comprises a plurality of fluid resistors respectively connecting each of the first outlet passages of said plurality of inverters to the first control nozzle of said output fluid amplifier, and
said second connecting means comprises a plurality of fluid resistors respectively connecting each of the second outlet passages of said plurality of inverters to the second control nozzle of said output fluid amplifier.

10. A pure fluid logical circuit in accordance with claim 9 wherein said output fluid amplifier is bistable.

11. A pure fluid logical circuit in accordance with claim 9 wherein said output fluid amplifier is a proportional amplifier.

References Cited

UNITED STATES PATENTS

| 3,093,306 | 6/1963 | Warren | 137—815 XR |
| 3,128,039 | 4/1964 | Norwood | 137—815 XR |
| 3,227,368 | 1/1966 | Jacoby. | |
| 3,250,285 | 5/1966 | Vockroth | 137—81.5 |
| 3,276,689 | 10/1966 | Freeman. | |
| 3,285,264 | 11/1966 | Boothe | 137—81.5 |
| 3,342,197 | 9/1967 | Phillips | 137—81.5 |
| 3,390,611 | 7/1968 | Warren | 137—81.5 XR |

SAMUEL SCOTT, Primary Examiner